(12) United States Patent
Nagamma

(10) Patent No.: US 9,489,704 B2
(45) Date of Patent: Nov. 8, 2016

(54) SYSTEMS AND METHODS FOR TRACKING PUBLIC TRANSPORTATION VEHICLES USING AN INTERNET-ENABLED DEVICE

(71) Applicant: SLING MEDIA PVT LTD, Bangalore (IN)

(72) Inventor: Manjunatha Dhummappa Nagamma, Bengaluru (IN)

(73) Assignee: Sling Media, PVT Ltd., Bangalore (IN)

( * ) Notice: Subject to any disclaimer, the term of this patent is extended or adjusted under 35 U.S.C. 154(b) by 0 days.

(21) Appl. No.: 14/584,037

(22) Filed: Dec. 29, 2014

(65) Prior Publication Data

US 2016/0189322 A1 Jun. 30, 2016

(51) Int. Cl.
G06G 7/70 (2006.01)
G06Q 50/26 (2012.01)
G08G 1/00 (2006.01)

(52) U.S. Cl.
CPC ............... *G06Q 50/26* (2013.01); *G08G 1/20* (2013.01)

(58) Field of Classification Search
USPC .......................... 701/400–541; 340/988–996
See application file for complete search history.

(56) References Cited

U.S. PATENT DOCUMENTS

| | | | |
|---|---|---|---|
| 6,006,159 A | 12/1999 | Schmier et al. | |
| 2006/0292984 A1* | 12/2006 | Teate | G08G 1/123 455/41.2 |
| 2009/0170521 A1* | 7/2009 | Dubs | H04M 1/7253 455/442 |
| 2010/0197325 A1 | 8/2010 | Dredge | |
| 2011/0210816 A1* | 9/2011 | Wang | H04L 63/0428 340/3.71 |

\* cited by examiner

*Primary Examiner* — Muhammad Shafi
(74) *Attorney, Agent, or Firm* — LK Global

(57) ABSTRACT

A system for tracking a public transportation vehicle includes a reporting device implemented on the public transportation vehicle that transmits a signal including information regarding an identity of the public transportation vehicle and a receiving device implemented on a public transportation station that receives the signal from the reporting device and communicates the information regarding the identity of the public transportation vehicle and a time-stamp regarding an arrival of the public transportation vehicle at the public transportation station. The system further includes an internet-enabled back-end server that receives the communication from the reporting device and stores the identity of the public transportation vehicle and the time-stamp regarding the arrival of the public transportation vehicle at the public transportation station in a database of the back-end server. The back-end server is configured to allow access of its database by an internet-enabled commuter device.

18 Claims, 4 Drawing Sheets

SYSTEMS AND METHODS FOR TRACKING PUBLIC TRANSPORTATION VEHICLES USING AN INTERNET-ENABLED DEVICE

TECHNICAL FIELD

The present disclosure relates generally to systems and methods for that assist a user in using public transportation. More particularly, the present disclosure relates to systems and methods for tracking public transportation vehicles using an internet-enabled device.

BACKGROUND

One disadvantage to the use of public transportation systems remains the possibility of vehicles, such as busses, trains, light rail, and the like, arriving later or earlier than their scheduled times. A commuter may be irritated by arriving tardy to a destination, missing a train or bus, or simply by spending time waiting for a late vehicle. A public transportation system operator may publish a schedule providing arrival and departure times of vehicles for the system's routes. The public transportation system operator, however, is sometimes unable to keep the schedule, for example at high-traffic times, for reasons such as traffic congestion, inclement weather, commuter load, and vehicle service issues. Additionally, regardless of how well an operator is able to keep a schedule, a commuter who uses public transit or a particular route infrequently, or a commuter from outside of the region in which the particular public transportation system operates, is unlikely to have a schedule readily accessible.

A commuter waiting at a depot or transit stop for a bus or train, for example, may not know with any certainty when the next vehicle will arrive at the station. If a commuter arrives at the stop only a moment before a scheduled arrival time, and the next vehicle does not arrive at that time, the commuter may be uncertain as to whether or not the bus or train may have arrived and departed before-hand, or if or when the vehicle will arrive. Such confusion may, of course, be mitigated by arriving early at the station to avoid missing the bus or train. This approach, however, wastes time, and extends the length of what may already be a long commute, and which may be better spent by the commuter in other more advantageous pursuits.

As such, there is a continuing need in the art for systems and methods that allow commuters to better predict the arrival of a public transportation vehicle at a particular station. The proliferation of internet-enabled devices, such as smartphones and personal computers, additionally make it desirable for such systems and methods to be accessible using such devices. Moreover, other desirable features and characteristics of the present disclosure will become apparent from the subsequent detailed description the appended claims, taken in conjunction with the accompanying drawings and background.

BRIEF SUMMARY

The various embodiments disclosed herein relate to systems and methods for tracking a public transportation vehicle. In one exemplary embodiment, a system includes a reporting device implemented on the public transportation vehicle that transmits a signal including information regarding an identity of the public transportation vehicle and a receiving device implemented on a public transportation station that receives the signal from the reporting device and communicates the information regarding the identity of the public transportation vehicle and a time-stamp regarding an arrival of the public transportation vehicle at the public transportation station. The system further includes an internet-enabled back-end server that receives the communication from the reporting device and stores the identity of the public transportation vehicle and the time-stamp regarding the arrival of the public transportation vehicle at the public transportation station in a database of the back-end server. The back-end server is configured to allow access of its database by an internet-enabled commuter device.

In another exemplary embodiment, a method includes the steps of transmitting from the public transportation vehicle a signal comprising information regarding an identity of the public transportation vehicle, receiving at a public transportation station the signal from the public transportation vehicle. The method further includes communicating to an internet-enabled back-end server the information regarding the identity of the public transportation vehicle and a time-stamp regarding an arrival of the public transportation vehicle at the public transportation station and storing the identity of the public transportation vehicle and the time-stamp regarding the arrival of the public transportation vehicle at the public transportation station in a database at the back-end server. Still further, the method includes allowing access of the database by an internet-enabled commuter device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The disclosed embodiments will hereinafter be described in conjunction with the following drawing figures, wherein like numerals denote like elements, and wherein.

DETAILED DESCRIPTION

Figure 1:
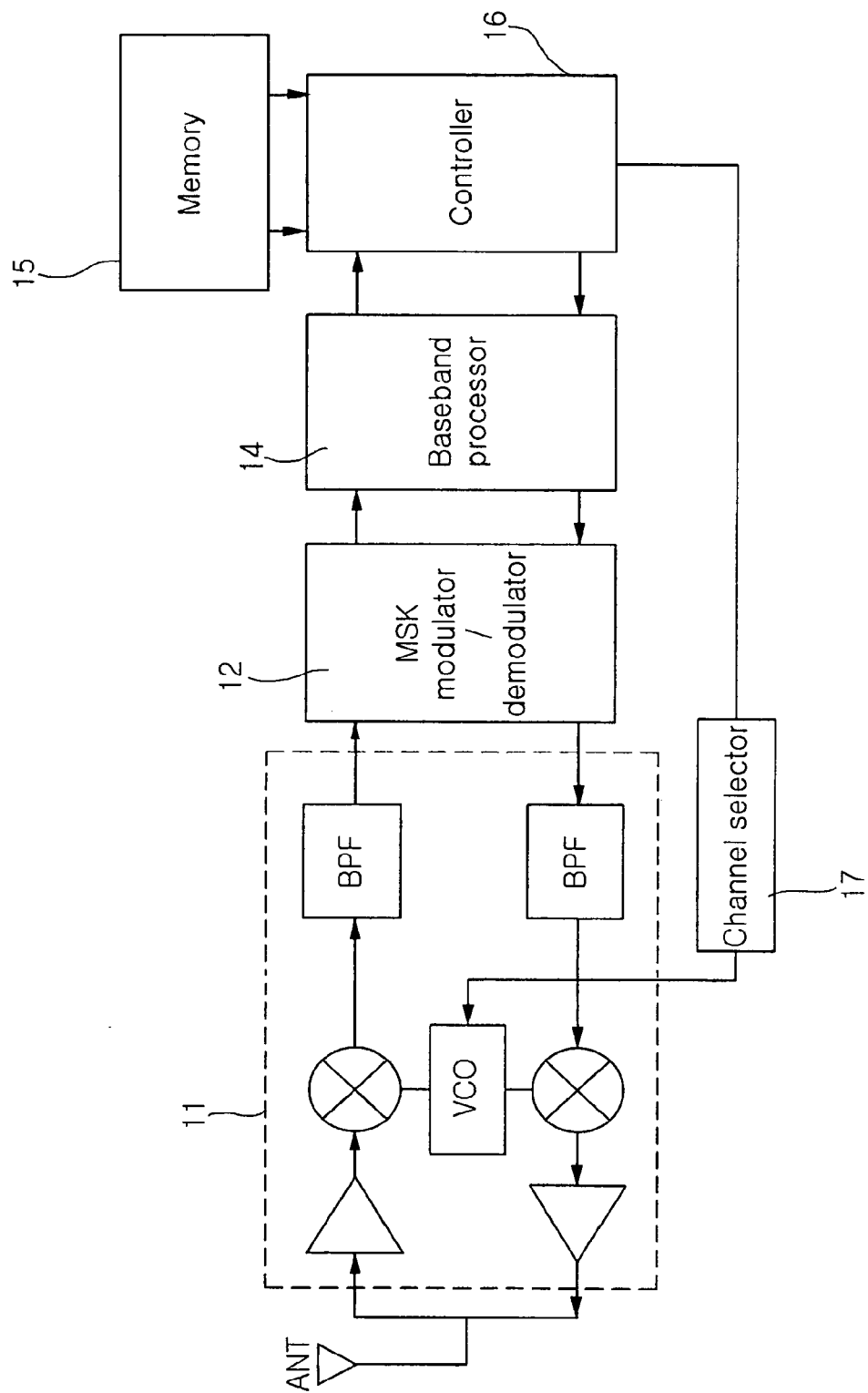
FIG. 1 shows a configuration of a Zigbee transceiver, which may be employed as the wireless communication-enabled reporting device in an embodiment.

The following detailed description is merely illustrative in nature and is not intended to limit the embodiments of the subject matter or the application and uses of such embodiments. As used herein, the word "exemplary" means "serving as an example, instance, or illustration."Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the present disclosure are generally directed to systems and methods for tracking public transportation vehicles using an internet-enabled device. The system includes a wireless communication-enabled reporting device, a wireless communication-enabled receiving device which is also internet connected, an internet-enabled back-end server located remotely from the reporting and receiving devices, and a software-based application ("app") that is configured to run on a commuter's internet-enabled device, such as a smartphone or personal computer. Each public transportation vehicle includes a reporting device thereon. Each station, depot, or stop (collectively referred to hereinafter simply as a "station") includes a receiving device. The method includes the step of, upon the arrival of a public transportation vehicle at a station, the reporting device wirelessly sending a signal to the receiving device that the vehicle associated with the report device has arrived at the station. The method further includes sending a signal from the receiving device to the back-end server indicating that the particular vehicle has arrived at the station associated with the receiving device. At the back-end server, a database or other data storage means is updated to indicate the current position of the particular vehicle based on the signal sent from the particular receiving device. Still further, the method includes the commuter using his/her internet-enabled smartphone device to access the internet-enabled back-end server to obtain the information in the database thereof regarding the current position of the particular vehicle. A public transportation system may include a plurality of reporting devices, one each on a plurality of vehicles of the public transportation system; and it may also include a plurality of receiving devices, one each on a plurality of stations of the public transportation system.

Wireless Communication-Enabled Reporting Device

In an embodiment, the wireless communication-enabled reporting device is installed on a vehicle of a public transportation system. Each vehicle of a system/network of vehicles may include such a reporting device. The reporting device is configured to send/transmit a signal indicating the particular vehicle with which the reporting device is associated. The reporting device may be enabled for wireless communication using any known wireless communication standard, such as Zigbee or Bluetooth.

For example, FIG. 1 shows a configuration of a Zigbee transceiver, which may be employed as the wireless communication-enabled reporting device. The Zigbee transceiver shown in FIG. 1 includes an RF front end processor 11 for converting an RF reception signal corresponding to a channel selected out of 2.4 GHz RF reception signals into an IF reception signal, and converting an IF transmission signal into an RF transmission signal of the selected channel; an MSK modulator/demodulator 12 for demodulating the IF reception signal from the RF processor 11 into a baseband reception signal by Minimum Shift Keying (MSK), and modulating a baseband transmission signal into the IF transmission signal by MSK to output to the RF processor 11; a baseband processor 14 for converting the baseband reception signal MSK-demodulated by the MSK modulator/demodulator 12 into a digital reception signal by bandpass processing, and converting the digital transmission signal into the baseband transmission signal by bandpass processing to output to the MSK modulator/demodulator 12; a memory 15 storing a firmware to control Zigbee transmission/reception, a controller 16 for executing Zigbee transmission/reception control including channel selection control by executing the firmware of the memory 15, and receiving the digital reception signal from the baseband processor 14 and providing the digital transmission signal to the baseband processor 14; and a channel selector 17 for selecting an RF channel of the RF processor 11 under the control of the controller 16.

Figure 2:
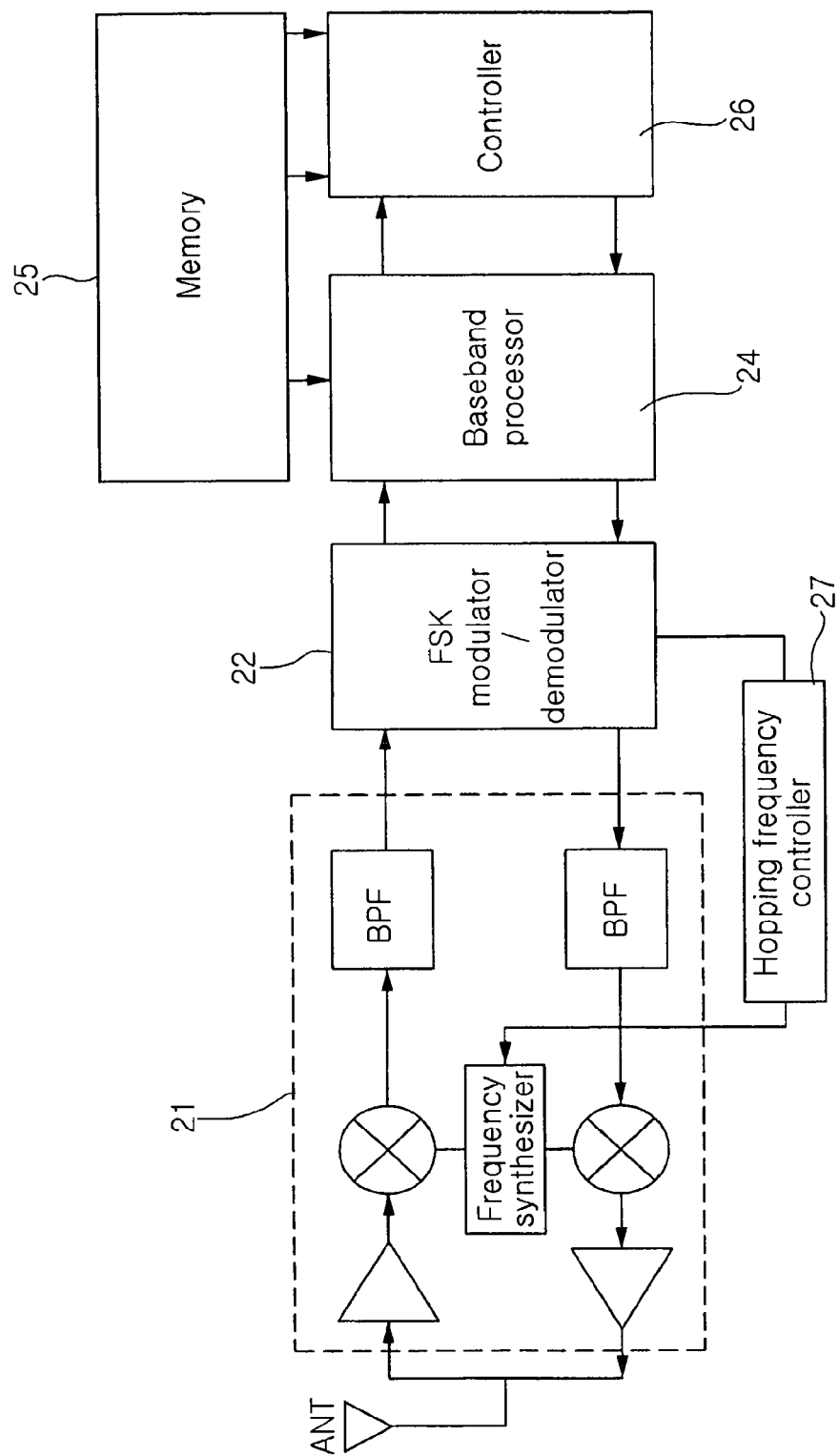
FIG. 2 shows a configuration of a Bluetooth transceiver, which may be employed as the wireless communication-enabled reporting device in an embodiment.

In another example, FIG. 2 shows a configuration of a Bluetooth transceiver, which may be employed as the wireless communication-enabled reporting device. The Bluetooth transceiver shown in FIG. 2 includes an RF front end processor 21 for converting an RF reception signal of 2.4 Hz RF reception signals into an IF reception signal under frequency hopping control, and converting an IF transmission signal into an RF transmission signal under frequency hopping control; an FSK modulator/demodulator 22 for FSK-demodulating an IF transmission signal from the RF processor 21 into a baseband reception signal and FSK-modulating a baseband transmission signal into the IF transmission signal in accordance with pre-set hopping frequency to output to the RF processor 21; a baseband processor 24 for converting the baseband reception signal FSK-demodulated by the FSK modulator/demodulator 22 into a digital reception signal by bandpass processing, and converting a digital transmission signal into the baseband transmission signal by bandpass processing to output to the FSK modulator/demodulator 22; a memory 25 storing a firmware to control Bluetooth transmission/reception; a controller 26 for controlling Bluetooth transmission/reception by executing the firmware of the memory 25, receiving the digital reception signal from the baseband processor 24 and providing the digital transmission signal to the baseband processor 24, and a hopping frequency controller 27 for controlling hopping frequency of the RF processor 21 based on hopping frequency from the FSK modulator/demodulator 22.

Wireless Communication-Enabled Receiving Device

In an embodiment, the wireless communication-enabled receiving device is installed at a station of the public transportation system. Each station of a system/network of stations may include such a receiving device. The receiving device is configured to receive a signal from a reporting device when the reporting device is within the wireless communication range of the receiving device. The reporting device being within communication range of the receiving device indicates that the particular vehicle associated with the reporting device has arrived at the particular station associated with the receiving device. The reporting device broadcasts the signal using wireless communications, and the receiving device receives the broadcast signal from the reporting device when the reporting device is within communication range thereof. In this manner, the receiving device becomes aware that a particular public transportation vehicle has arrived at a particular public transportation station. The receiving device may be enabled for wireless communication using any known wireless communication standard, such as Zigbee or Bluetooth, but corresponding with the technology selected for the reporting device to ensure compatibility. In this regard, FIGS. 1 and 2 provide a summary of the technology that is also to be used for the receiving device so as to ensure compatibility with the reporting device.

When a public transportation vehicle stops at a station, information is exchanged between the reporting device and the receiving device. The data is then authenticated by the receiving device. The receiving device at each station is connected via an electronic communication means (such as wired or wireless means) to an internet-enabled back-end server, as will be discussed in greater detail below. In one embodiment, the electronic communication means is the internet. The receiving device communicates information via the electronic communication means upon the receipt thereof from a reporting device and upon the authentication thereof. The communicated information includes the identity of the vehicle that has arrived and the identity of the station associated with the receiving device, and also the time of the arrival (time-stamp), among other possible information. In this manner, the communication from the receiving device to the back-end server includes information that a particular vehicle has arrived at a particular station. Further, it should be noted that the receiving device will include a network port for a wired or wireless network. Wireless technologies such as GSM or LTE may are suitable for providing wireless network capability in this regard.

Internet-Enabled Back-End Server

In an embodiment, the internet-enabled back-end server is configured to receive the electronic communication from the receiving device that indicates that a particular public transportation vehicle has arrived at a particular station. The back-end server may be electronically connected, via the electronic communication means such as the internet, with each receiving device of the plurality of receiving devices, one being installed at each station of the plurality of stations that form the public transportation network, and may be located remotely from each such station. The back-end server includes a database that records and stores each incoming communication from each receiving device. In this manner, the back-end server maintains and stores up-to-date information regarding each station, that is, regarding which particular vehicle has most recently arrived at each station, as well as possibly historical information regarding previous arrivals of vehicles at particular stations. The back-end server is internet enabled such that commuters who have access to the internet are able to access the information stored in the back-end server. In this regard, a commuter with internet access is able to access the back-end server and access the information stored in the database thereof. As such, the commuter is able to access data for a particular station and determine whether a particular vehicle of interest (which may be identified by route number) has arrived at or reached previous station(s). The commuter may use this information to determine their schedule for arriving at the station to reduce waiting time, for example.

Figure 3:
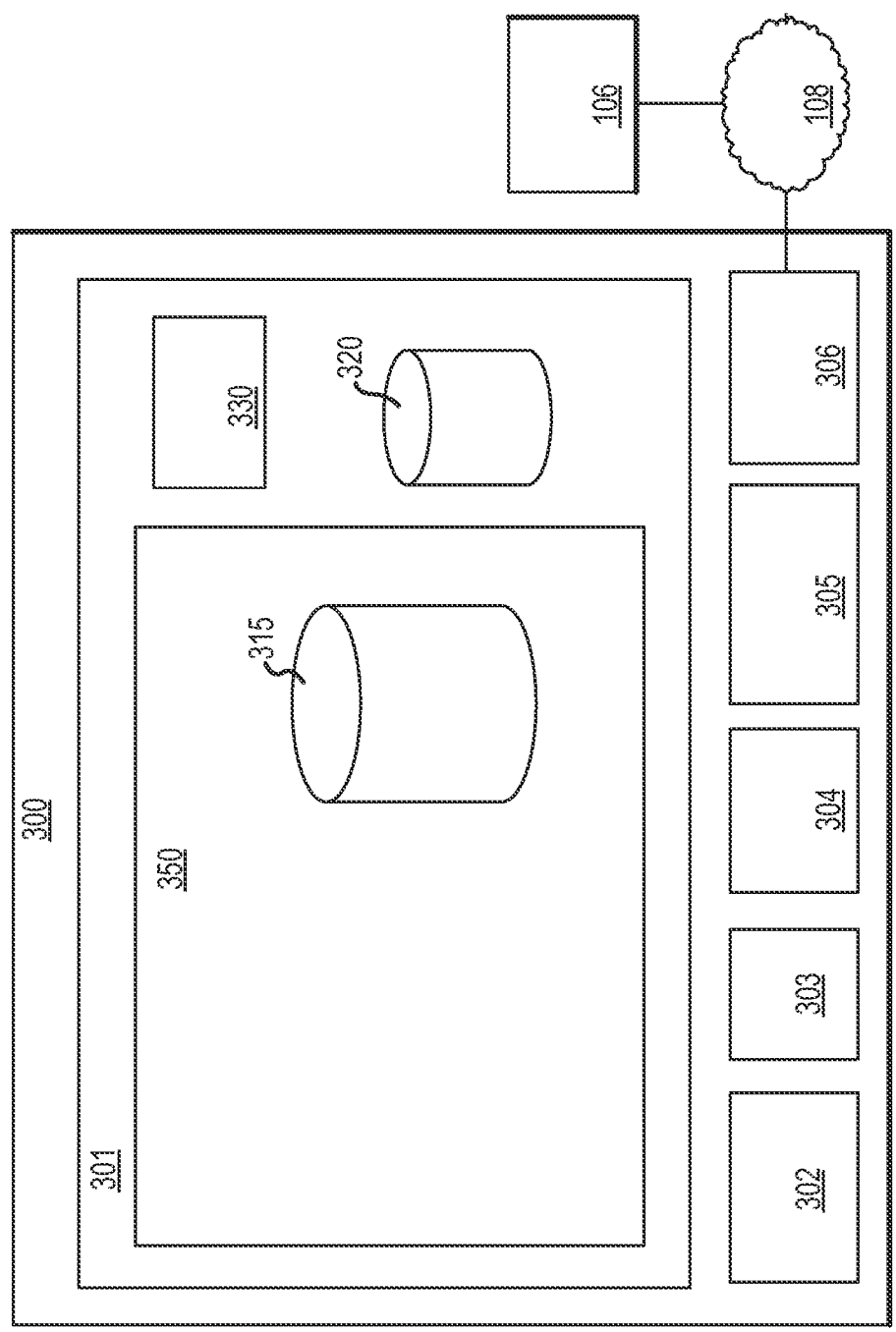
FIG. 3 shows a computing system that may be utilized to implement a back-end server in an embodiment.

An implementation of an exemplary internet-enabled back-end server is described in connection with FIG. 3. That is, FIG. 3 shows a computing system 300 that may be utilized to implement a back-end server 350. Computing system 300 may be connected to a network 108, which in turn may be connected to one or a plurality of other network-connected devices 106. In one embodiment, the computing system 300 is a server computing system that is located in a data center (remote from the stations) and that provides data services for the entire public transportation system network. Note that one or more general purpose or special purpose computing systems/devices may be used to implement the back-end server 350. In addition, the computing system 300 may include one or more distinct computing systems/devices and may span distributed locations. Furthermore, each block shown may represent one or more such blocks as appropriate to a specific embodiment or may be combined with other blocks. Also, the back-end server 350 may be implemented in software, hardware, firmware, or in some combination to achieve the capabilities described herein.

In the embodiment shown, computing system 300 includes a computer memory ("memory") 301, a display 302, one or more Central Processing Units ("CPU") 303, Input/Output devices 304 (e.g., audio processor, video processor, keyboard, mouse, CRT or LCD display, and the like), other computer-readable media 305, and network connections 306. The back-end server 350 is shown residing in memory 301. In other embodiments, some portion of the contents, some of, or all of the components of the back-end server may be stored on and/or transmitted over the other computer-readable media 305. The components of the back-end server 350 preferably execute on one or more CPUs 303 and facilitate the receipt and storage of vehicle arrival and station information, as described herein. Other code or programs 330 (e.g., an administrative interface, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide other computer readable media 305 or a display 302.

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a back-end server implementation. Also, other functions could be implemented and/or performed by each component/module, and in different orders, and by different components/modules, yet still achieve the functions of the back-end subsystem.

In addition, programming interfaces to the data stored as part of back-end server 350, such as in the data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 315 may be implemented as one or more database systems, file systems, or any other technique for storing such information, or any combination of the above, including implementations using distributed computing techniques.

Furthermore, in some embodiments, some or all of the components of the back-end server 350 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the subsystem components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the subsystem components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Commuter's Internet-Enabled Device

In one embodiment, a commuter uses an internet-enabled device to access the information stored on the internet-enabled back-end server. The internet provides the electronic communication means to facilitate such information access between the commuter's device and the server. For example, a commuter may use their device to access information on a particular vehicle of the public transportation system (i.e., to determine which station the particular vehicle most recently arrived at, or had arrived in the past at) or the commuter may user their device to access information on a particular station of the public transportation system (i.e., to determine which vehicle most recently arrived at the particular station, or had arrived there-at in the past). The commuter's device communicates electronically with the back-end server, via the internet, to access this information.

Examples of the commuter's internet-enabled device include, but are not limited to, a television ("TV"), a personal computer ("PC"), a sound system receiver, a digital video recorder ("DVR"), a compact disk ("CD") device, game system, cell phone, smartphone, electronic tablet, or the like. Devices can employ a display, one or more speakers, and/or other output devices to communicate visual and/or audio content to a user. The device transmits and receives data via an Internet Protocol ("IP") network established over wire-based and/or wireless communication media.

Software-Based Application

In an embodiment, the software-based application ("app") may reside on the commuter's internet-enabled device, or it may be stored on the back-end server and accessed via the internet. The app provides a convenient means for the commuter to easily and intuitively access information from the back-end server. For example, the app may include features that allow the commuter to access information regarding a particular station in an easy-to-read format. In another example, the app may include features that allow the commuter to access information regarding a particular vehicle in an easy-to-read format. In this regard, the app accesses data from the back-end server and transforms the data into a format for easier viewing by the commuter. The app may also provide various authentication functions between the back-end server and the commuter, for example where the information from the back-end server is provided on a fee-based subscription basis.

For example, the app may be implemented as a "native" executable running on the commuter's device or the back-end server, along with one or more static or dynamic libraries. In other embodiments, the app may be implemented as instructions processed by a virtual machine that executes as one of the other programs. In general, a range of programming languages known in the art may be employed for implementing such exemplary embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

Method of Operation of the System

Figure 4:
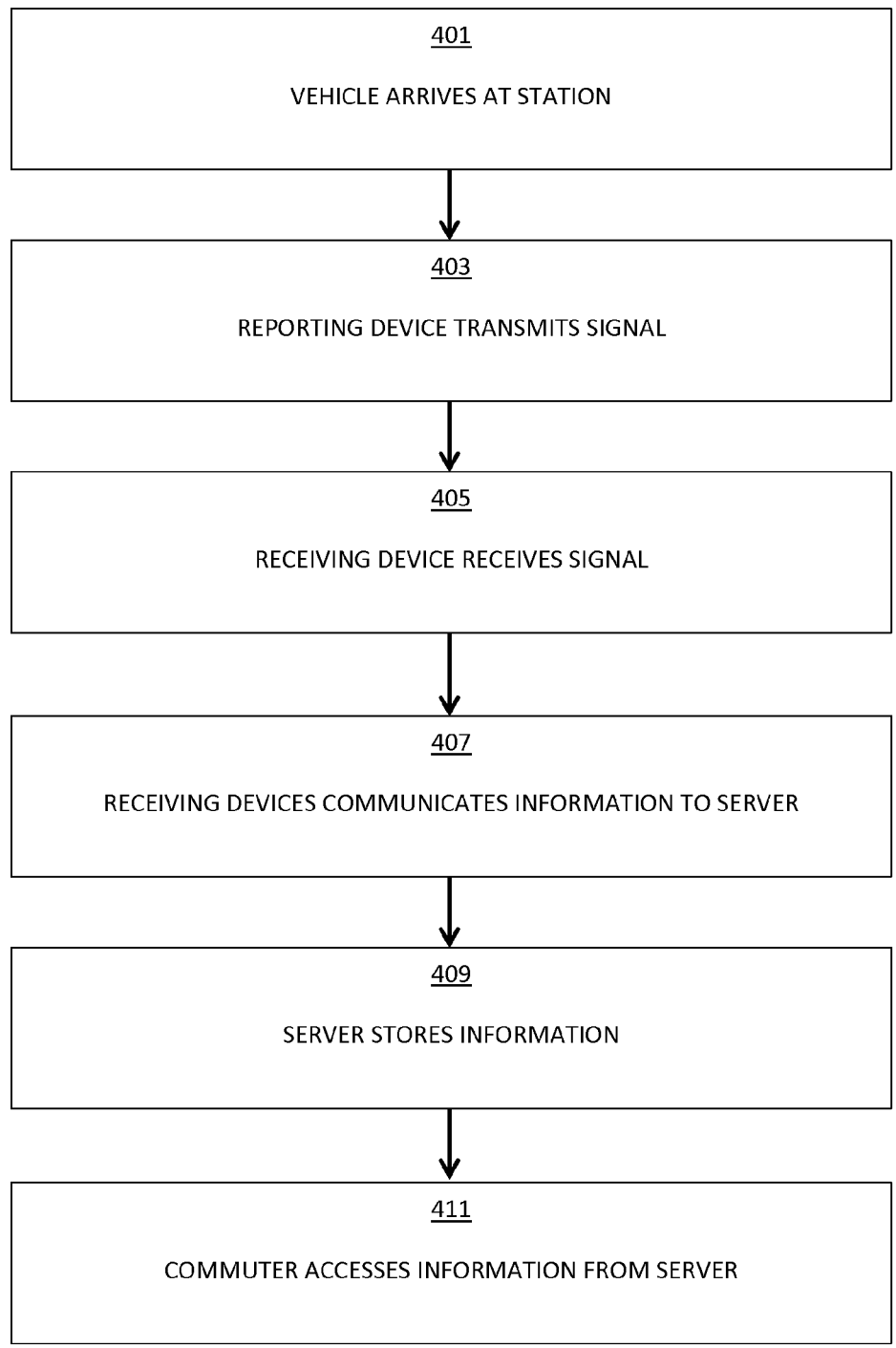
FIG. 4 is a block-and-flow diagram of a method of operation of the exemplary systems described herein in accordance with an embodiment.

FIG. 4 illustrates a method 400 of operation of the exemplary systems described herein in accordance with an embodiment. The method is provided in the context of a public transportation system including a plurality of vehicles (each having a dedicated reporting device), a plurality of stations (each having a dedicated receiving device), a remotely-located back-end server, and a plurality of commuter's, each of which being in possession of an internet-enabled device. At step 401, a vehicle approaches or arrives at a station. The vehicle includes a dedicated reporting device that intermittently or continuously broadcasts/transmits a signal (e.g., using Bluetooth or Zigbee technologies). Thus, step 403 includes transmitting a signal indicating the identity of the vehicle by the reporting device on the associated with the vehicle. When in the communication range, the signal from the reporting device is received by the receiving device at the station at which the vehicle is approaching/has arrived at. Thus, step 405 includes receiving the signal indicating the identity of the vehicle by the receiving device associated with the station. The receiving device at the station authenticates the received signal and then communicates information regarding the arrival of the vehicle to the remotely-located back-end server. Thus, step 407 of method 400 includes communicating information regarding the identity of the vehicle and the time of arrival at the station to the back-end server. This communication may be accomplished by an electronic network, such as the internet. At step 409, the back-end server stores the information regarding the identity of the vehicle and the time of arrival of the vehicle at the particular station on a database associated with the back-end server. The database is also configured to store current and historical arrival information for each vehicle and each station. Still further, at step 411, the method 400 includes the commuter using an internet-enabled device to access the arrival information stored at the back-end server. The access may be accomplished by communication over the internet between the commuter's device and the back-end server, and may be facilitated by an application stored at the server or on the user's device.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment, it being understood that various changes may be made in the function and arrangement of elements described and methods of preparation in an exemplary embodiment without departing from the scope of the invention, which is set forth in the appended claims and their legal equivalents.

What is claimed is:

1. A system for tracking a public transportation vehicle comprising:

a reporting device implemented on the public transportation vehicle that transmits a signal comprising information regarding an identity of the public transportation vehicle;

a receiving device implemented on a public transportation station that receives the signal from the reporting device and communicates the information regarding the identity of the public transportation vehicle and a time-stamp regarding an arrival of the public transportation vehicle at the public transportation station to an internet-enabled back-end server located remotely through the internet; and the internet-enabled back-end server that receives the communication from the reporting device and stores the identity of the public transportation vehicle and the time-stamp regarding the arrival of the public transportation vehicle at the public transportation station in a database of the back-end server, wherein the back-end server is configured to allow access of its database by an internet-enabled commuter device, and wherein the back-end server comprises a software-based application that facilities the commuter's access of the database, and wherein access of the database comprises both: (1) access to information on a particular vehicle of the public transportation system and (2) access to information of a particular station of the public transportation system.

2. The system of claim 1, wherein the reporting device transmits the signal using Bluetooth technology.

3. The system of claim 2, wherein the receiving device receives the signal using Bluetooth technology.

4. The system of claim 1, wherein the reporting device transmits the signal using Zigbee technology.

5. The system of claim 4, wherein the receiving device receives the signal using Zigbee technology.

6. The system of claim 1, wherein the public transportation vehicle comprises a bus or a train.

7. The system of claim 1, wherein the system is enabled for a plurality of public transportation vehicles.

8. The system of claim 7, wherein the system is enable for a plurality of public transportation stations.

9. The system of claim 1, wherein the back-end server is located remotely from the public transportation station.

10. The system of claim 9, wherein the receiving device communicates with the back-end server over the internet.

11. The system of claim 1, wherein the commuter device comprises a smartphone.

12. The system of claim 1, wherein the commuter device comprises a personal computer.

13. The system of claim 1, wherein the commuter's device comprises a software-based application that facilitates the commuter's access of the database.

14. A method for tracking a public transportation vehicle comprising the steps of:

automatically transmitting, from a wireless signal transmitter, from the public transportation vehicle an electronic signal comprising digital or analog information regarding an identity of the public transportation vehicle;

automatically receiving, from a wireless signal receiver, at a public transportation station the electronic signal from the public transportation vehicle;

automatically and electronically communicating to an internet-enabled back-end server the information regarding the identity of the public transportation vehicle and a time-stamp regarding an arrival of the public transportation vehicle at the public transportation station, wherein the step of automatically and electronically communicating is accomplished using the internet;

automatically and electronically storing the identity of the public transportation vehicle and the time-stamp regarding the arrival of the public transportation vehicle at the public transportation station in a non-transitory database at the back-end server;

allowing public to have remote and electronic access of the non-transitory database by an internet-enabled commuter device using a computer software-enable application at the back-end server, wherein the step of allowing access is facilitated by a software-based application, and wherein access of the database comprises both: (1) access to information on a particular vehicle of the public transportation system and (2) access to information of a particular station of the public transportation system.

15. The method of claim 14, wherein the step of transmitting is performed using Bluetooth or Zigbee technology.

16. The method of claim 15, wherein the step of receiving is performed using Bluetooth or Zigbee technology.

17. The method of claim 14, wherein the step of communicating is performed using the internet.

18. The method of claim 14, wherein the step of receiving is performed upon arrival of the public transportation vehicle at the public transportation station.

* * * * *